S. Curtiss, Jr.
Administering Medicines.
N° 53,790.        Patented Apr. 10, 1866.
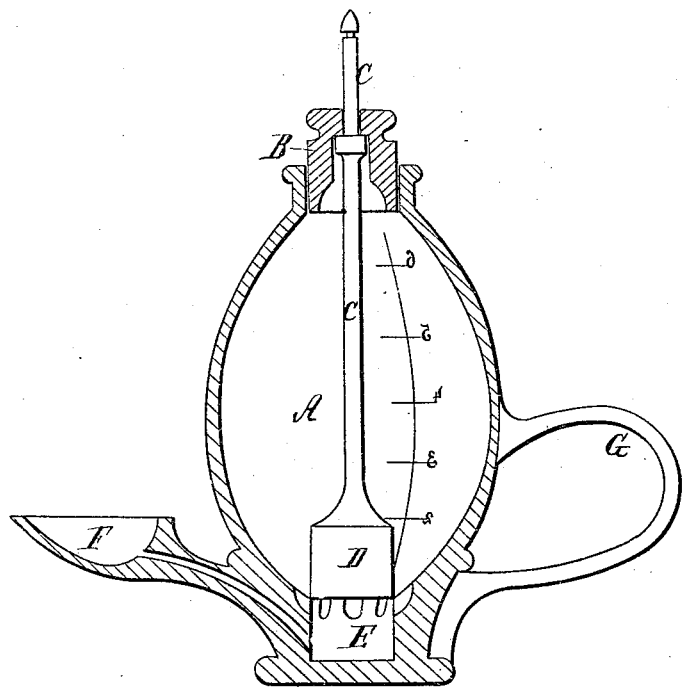

United States Patent Office.

SAMUEL CURTISS, JR., OF WILLIAMSBURG, NEW YORK.

IMPROVEMENT IN APPARATUS FOR ADMINISTERING MEDICINES.

Specification forming part of Letters Patent No. 53,790, dated April 10, 1866.

*To all whom it may concern:*

Be it known that I, SAMUEL CURTISS, Jr., of South Sixth street, Williamsburg, Kings county, New York, have invented a new and useful Improvement in Apparatus for Measuring and Administering Medicine; and I do hereby declare that the following is a full, clear, and exact description thereof, which will enable others skilled in the art to make and use the same, reference being had to the accompanying drawing, forming part of this specification, in which the drawing is a vertical longitudinal section of my improved apparatus, the piston being shown as raised to allow the medicine to flow into the reservoir.

My invention has for its object the furnishing an apparatus for containing medicine when prepared for the patient, having a scale for measuring the quantity prepared, a reservoir for measuring the quantity to be given at one time, and a spoon-shaped orifice for administering the same; and it consists of an apparatus constructed and arranged for those purposes, as hereinafter more fully described.

A is the body of the apparatus. B is the stopper. C is the piston-rod. D is the piston. E is the reservoir. F is the spoon-shaped orifice, and G is the handle.

The apparatus is designed to be made of glass, but may be made of rubber, metal, or other material, and has a scale marked on one side of the body A, showing the amount contained when filled up to any given point. The scale is made with the piston D pushed down to the bottom of the reservoir E, so as to close the passage to the orifice F. The piston D is ground so as to fit exactly into the reservoir E, and when pushed down to entirely close the passage to the said orifice.

The piston is kept from being drawn entirely from the reservoir E by a projection on the piston-rod G, which strikes against a shoulder formed in the stopper B, as shown in the drawing, and in order that the contents of the cup may pass into the reservoir E a number of grooves are made in the upper part of the reservoir E, which, when the piston is raised to the position shown in the drawing, form passages through which the medicine may flow into and fill the reservoir E. The stopper B is also ground into the mouth of the cup.

In using the apparatus the piston D is pushed to the bottom of the reservoir E, and the desired amount is poured into the cup A, according to the scale formed on the side of said cup, and the stopper B inserted.

In administering the medicine, the piston D is raised and the reservoir E allowed to fill. Then, by pushing down the piston D into the reservoir E, the contents of said reservoir are forced through the passage into the spoon-shaped orifice F, from which it is taken by the patient.

By means of this apparatus medicine may be taken in the dark as well as in the light, and without the possibility of mistaking or varying the amount given.

The handle G may be made with projections, or projections and curves, on its upper and lower parts, for the thumb and fingers to rest against in using the apparatus, if desired.

Having thus described my invention, what I claim as new, and desire to secure by Letters Patent, is—

An apparatus for measuring and administering medicine, constructed and arranged substantially as described, and for the purpose set forth.

The above specification of my invention signed by me this 2d day of January, 1866.

SAMUEL CURTISS, JR.

Witnesses:
JAMES T. GRAHAM,
M. M. LIVINGSTON.